(12) United States Patent
Avudaiyappan (10) Patent No.: US 10,073,781 B2
(45) Date of Patent: *Sep. 11, 2018

(54) SYSTEMS AND METHODS FOR INVALIDATING DIRECTORY OF NON-HOME LOCATIONS WAYS

(71) Applicant: Intel Corporation, Santa Clara, CA (US)

(72) Inventor: Karthikeyan Avudaiyappan, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 430 days.

This patent is subject to a terminal disclaimer.

(21) Appl. No.: 14/515,345

(22) Filed: Oct. 15, 2014

(65) Prior Publication Data

US 2016/0110293 A1    Apr. 21, 2016

(51) Int. Cl.
*G06F 12/0831*    (2016.01)
*G06F 12/0817*    (2016.01)

(52) U.S. Cl.
CPC ...... *G06F 12/0833* (2013.01); *G06F 12/0824* (2013.01)

(58) Field of Classification Search
CPC ....... G06F 12/121; G06F 12/126; G06F 12/12
See application file for complete search history.

(56) References Cited

U.S. PATENT DOCUMENTS

| 2004/0073769 | A1* | 4/2004 | Debes | G06F 12/0875 711/217 |
| 2005/0188156 | A1* | 8/2005 | Mukker | G06F 12/128 711/129 |
| 2008/0040547 | A1 | 2/2008 | Abadeer et al. | |
| 2012/0159080 | A1 | 6/2012 | Donley et al. | |
| 2014/0019686 | A1* | 1/2014 | Dong | G06F 12/0864 711/128 |
| 2014/0136773 | A1* | 5/2014 | Michalak | G06F 3/0655 711/105 |

OTHER PUBLICATIONS

Non-Final Office Action from U.S. Appl. No. 14/515,333, dated Dec. 20, 2016, 9 pages.
Advisory Action from U.S. Appl. No. 14/515,345, dated Jun. 15, 2017, 3 pages.
(Continued)

*Primary Examiner* — Prasith Thammavong
*Assistant Examiner* — Edmund H Kwong
(74) *Attorney, Agent, or Firm* — NDWE LLP (57) ABSTRACT

Systems and methods for invalidating a way of a directory for non-home locations (DNHL) set that stores an identifier of a home location of an address is disclosed. As a part of a method, a request to store data in a location of a special cache that is being tracked by the way of the DNHL set is accessed, it is determined if an address stored in the location of the special cache is stored in a non-home location, a DNHL set is identified that tracks the location of the special cache if the address is not stored in a non-home location, and a set and way of the location of the special cache is compared with a set and way identifier stored in each way of the DNHL set. The way of the DNHL set that stores a matching set and way identifier is invalidated.

40 Claims, 6 Drawing Sheets

(56) References Cited

OTHER PUBLICATIONS

Final Office Action from U.S. Appl. No. 14/515,333, dated Apr. 7, 2017, 8 pages.
Non-Final Office Action from U.S. Appl. No. 14/515,333, dated Aug. 1, 2017, 9 pages.
Final Office Action from U.S. Appl. No. 14/515,333, dated Jan. 10, 2018, 12 pages.

* cited by examiner

SYSTEMS AND METHODS FOR INVALIDATING DIRECTORY OF NON-HOME LOCATIONS WAYS

A cache in a central processing unit is a data storage structure that is used by the central processing unit of a computer to reduce the average time that it takes to access memory. It is a memory which stores copies of data that are located in the most frequently used main memory locations. Moreover, it is memory that is smaller, and that may be accessed more quickly, than main memory. There are several different types of caches.

Cache pollution can occur when an executing computer program loads data into CPU cache unnecessarily. This can cause data that is needed, to be evicted from the cache into lower levels of the memory hierarchy, potentially all the way down to main memory, resulting in performance degradation. Cache maintenance involves the invalidation of unneeded data in the cache for purposes of preventing performance degradation.

In conventional caches the location where an address can reside is a function of the address. These locations in caches are called the home locations for an address. Because the address is known, future accesses to the place in cache where an address resides, including for purposes such as the invalidation of unneeded data, involves a look up that is straightforward. However, such a dependence on the knowledge of specific addresses to identify cache lines can limit an extension of the cache's functionality.

SUMMARY

Some conventional systems depend on the knowledge of specific addresses in order to identify cache lines for invalidation purposes. This can limit an extension of such cache's functionality. Embodiments allow the storage of cache lines in cache locations that both are, and are not, a function of their addresses (in home locations and non-home locations respectively). Embodiments include a directory of non-home locations (DNHL) that enables a cache system to track, and limit the proliferation of, non-home locations. Conventional systems are not equipped to manage caches that maintain cache lines in both home locations and non-home locations. A method for invalidating a way of a DNHL that unintendedly stores an identifier of a home location of an address (instead of a non-home location address) is disclosed that helps to address such shortcomings. However, the claimed embodiments are not limited to implementations that address any or all of the aforementioned shortcomings. As a part of the aforementioned method, a request to store data (e.g., a cache line that includes an address) in a location of a special cache that is being tracked by a way of a DNHL is accessed, it is determined if an address stored in the location of the special cache is stored in a non-home location, a set is identified in the DNHL that tracks the location of the special cache if the address is not stored in a non-home location, and a set and way of the location of the special cache is compared with a set and way identifier stored in each way of the set of the DNHL. The way of the set of the DNHL that stores a matching set and way identifier is invalidated. The method enables the effectiveness of the DNHL to be maximized by ensuring that locations in the DNHL intended to track non-home locations of a special cache do not unintendedly track home locations. Consequently, unintended decreases in the accessibility to addresses stored in non-home locations, due to the occupation of locations in the DNHL by identifiers of special cache locations where addresses are stored in their home locations, are avoided.

In addition, systems and methods of invalidating a way of a DNHL set other than that which stores an identifier of a most accessed special cache set and way are disclosed. As a part of a method, a DNHL set that tracks a non-home location for an address that is to be stored in the non-home location and that is associated with an incoming request is determined, if none of one or more ways of the DNHL set are available for storing an identifier of the non-home location, the way of the one or more ways that has been most accessed is determined. A way of the DNHL set other than the way of the DNHL set that has been most accessed is invalidated. The method facilitates effective use of the special cache by ensuring that the most accessed data in the special cache (that is stored in non-home locations) is not removed from the special cache based on the invalidation of corresponding DNHL locations.

BRIEF DESCRIPTION OF THE DRAWINGS

The invention, together with further advantages thereof, may best be understood by reference to the following description taken in conjunction with the accompanying drawings in which.

It should be noted that like reference numbers refer to like elements in the figures.

DETAILED DESCRIPTION

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "determining" or "identifying" or "comparing" or "invalidating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

In exemplary embodiments, as described in copending and commonly assigned U.S. patent application Ser. No. 14/515,333, and entitled "Methods and Systems for Tracking Addresses Stored in Non-Home Locations", which is incorporated herein in its entirety by reference, if the location of a cache line is not a function of the address of the cache line but is instead a function of another address (which is termed an indirect address) which has a relationship to the address of the cache line, such a location is called a non-home location of that cache line. In one embodiment, a cache is described in which a cache line may advantageously reside either in its home location or in a non-home location of a cache. Future accesses to locate a cache line in the non-home location can be performed if: (the address of the cache line, and (2) the indirect address of the cache line, are known at the time of access.

In some conventional systems, a function of software is to invalidate one or more cache lines from caches. To accomplish this, the software has to provide a cache with the addresses of the cache lines to be invalidated. However, software may not be able to provide a cache with an indirect address of a cache line that is seeks to invalidate. Consequently, if a cache line resides in a non-home location, the cache structure may not be able to locate the non-home location of the cache line to be invalided. The manner in which a cache line may be identified and invalidated, given such circumstances, is described in copending and commonly assigned U.S. patent application Ser. No. 14/515,333, and entitled "Methods and Systems for Tracking Addresses Stored in Non-Home Locations". U.S. patent application Ser. No. 14/515,333 describes systems for, and methods of, tracking and limiting the proliferation of cache lines that are stored in non-home locations of a cache. In one or more embodiments described in detail herein, such tracking of home locations and the unintended removal of the most accessed cache lines stored in a cache, is avoided.

Figure 1A:
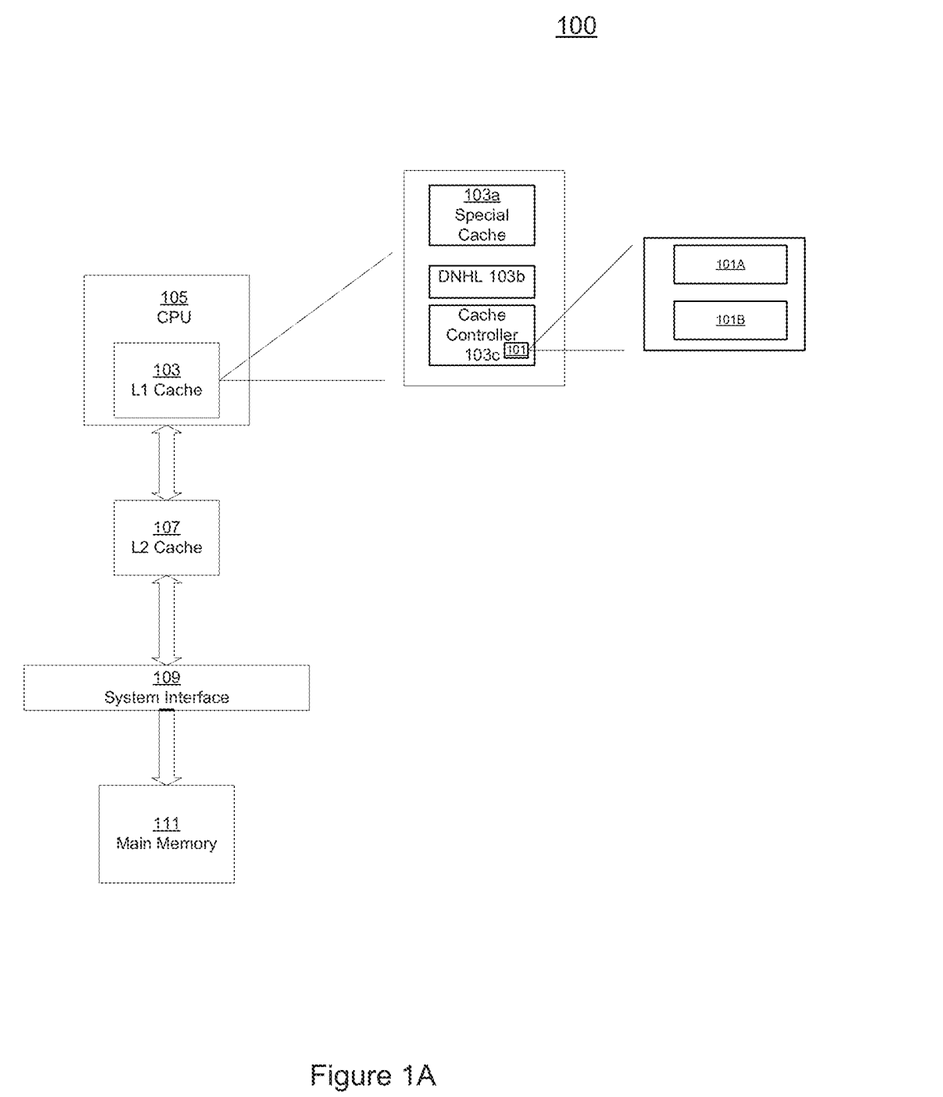
FIG. 1A shows an exemplary operating environment of a system for invalidating directory of non-home locations ways according to one embodiment.

Exemplary Operating Environment of a System for Invalidating Directory of Non-Home Location Ways According to One Embodiment FIG. 1A shows an exemplary operating environment 100 of system 101 for invalidating directory of non-home location (DNHL) ways. System 100 includes subsystem 101a for invalidating DNHL ways that store an identifier of a home location of an address (and its cache line) and subsystem 101b for invalidating a way of DNHL 103b other than that which stores an identifier of a most accessed way of DNHL 103b. In one embodiment, system 101a enables the effectiveness of DNHL 103b to be maximized by ensuring that locations in DNHL 103b intended to track non-home locations of special cache 103a do not unintendedly track home locations of special cache 103a. Consequently, unintended decreases in the accessibility of addresses (and their cache lines) to non-home locations (accessibility being based on the availability of space in DNHL 103b to track addresses that are stored in non-home locations) of special cache 103a, due to the occupation of locations in DNHL 103b by identifiers of special cache locations where addresses (and their cache lines) are stored in their home locations, are avoided.

In addition, in one embodiment, system 101b facilitates effective use of special cache 103a by ensuring that the most accessed data (e.g., cache lines) in special cache 103a (that is stored in non-home locations) is not removed from special cache 103a based on the invalidation of corresponding locations of DNHL 103b. As such, systems 101a and 101b prevent the degradation of the performance of DNHL 103b based on the unintended tracking of home locations and the unintended removal of the most accessed data stored in special cache 103a. FIG. 1A shows system 101, subsystems 101a and 101b, level one (L1) cache 103, special cache 103a, DNHL 103b, cache controller 103c, CPU 105, level two (L2) cache 107, system interface 109 and main memory 111.

Referring to FIG. 1A, level one (L1) cache 103 is the primary cache of the processor, and is a data storage component which can be integrated with the CPU 105 core. L1 cache 103 is used to store information recently accessed by CPU 105. In one embodiment, L1 cache 103 can include special cache 103a that is configured to accommodate the storage of cache lines in both their home and their non-home locations. In one embodiment, special cache 103a can reside in L1 cache 103 as shown in FIG. 1A. However, in other embodiments, special cache 103a can reside in other places. In addition, in one embodiment, L1 cache can include DNHL 103b which is a directory that is used to track addresses stored in non-home locations in special cache 103a. In one embodiment, L1 cache 103 can include cache controller 103c. In one embodiment, system 101 (see discussions that are provided herein below that describe in detail the operation of systems 101) can reside in cache controller 103c. L2 cache 107 is the secondary cache of CPU 105 and like L1 cache 103 is used to store recently accessed information. In the FIG. 1A embodiment, L2 cache 107 interfaces with the external fabric and is generally accessed for data before main memory 111.

As previously discussed, system 101a enables the effectiveness of DNHL 103b to be maximized by ensuring that locations in DNHL 103b intended to track non-home locations of special cache 103a do not unintendedly track home locations of special cache 103a. In one embodiment, system 101a invalidates the way of a set of DNHL 103b that stores a special cache set and way identifier that corresponds to a set and way of special cache 103a that is a home location of a stored address. The invalidation of the way of the set of DNHL 103b frees space that can be used to track an address that is intended to be stored in a non-home location of the special cache. In one embodiment, a bit in each of the cache lines stored in special cache 103a is used to indicate whether or not the addresses of the cache lines are stored in their non-home locations. Moreover, the sets of special cache 103a are correlated to sets of DNHL 103b. If a request is made to store data in a location of special cache 103a occupied by an address that is in its home location, the set of DNHL 103b corresponding to the location of special cache 103a can be examined to determine if the location is being unintendedly tracked by DNHL 103b. In one embodiment, determining whether a location is being unintendedly tracked in a set of DNHL 103b can be done by comparing the set and way of the location of special cache 103a where an address has been identified as being stored in its home location with set and way identifiers that are stored in each way of the set of DNHL 103b that is correlated to that location in special cache 103a. If there is a match, the matching way of the DNHL 103b set is invalidated.

In addition, in one embodiment, system 101B facilitates effective use of special cache 103a by ensuring that the most accessed data in special cache 103a (that is stored in non-home locations) is not removed from special cache 103a based on the invalidation of corresponding directory locations. In one embodiment, system 101B ensures that a way of a set of DNHL 103b other than that which corresponds to a most accessed location of special cache 103a is invalidated when an invalidation is performed for purposes of freeing space for an incoming request to store an address in a non-home location in a corresponding set of special cache 103a. In one embodiment, each way of DNHL 103b has a counter associated with it that tracks the number of times that the contents of the way is accessed (corresponding to the number of times content of the correlated location of special cache 103a is accessed). As such, a way that has been accessed the most can be directly determined by referencing counters and its invalidation prevented.

Referring again to FIG. 1A, main memory 111 includes physical addresses that store information that is copied into L1 cache 103 and L2 cache 107. Also shown in FIG. 1A is system interface 109.

Advantages of exemplary embodiments, as mentioned above, include the prevention of the degradation of the performance of the DNHL 103b based on the unintended tracking of home locations and the unintended removal of the most accessed data stored in special cache 103a.

Operation

Figure 1B:
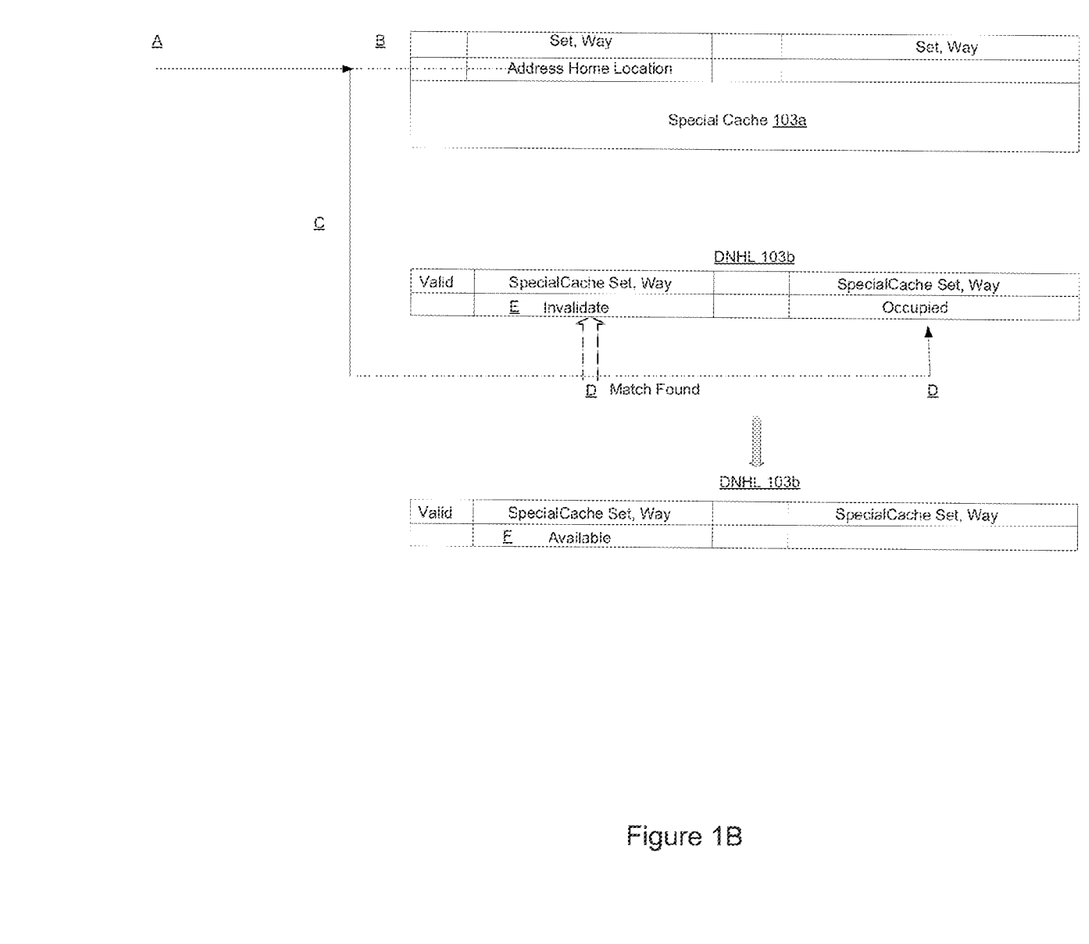
FIG. 1B illustrates operations performed by a system for invalidating directory of non-home locations ways according to one embodiment.
Figure 1C:
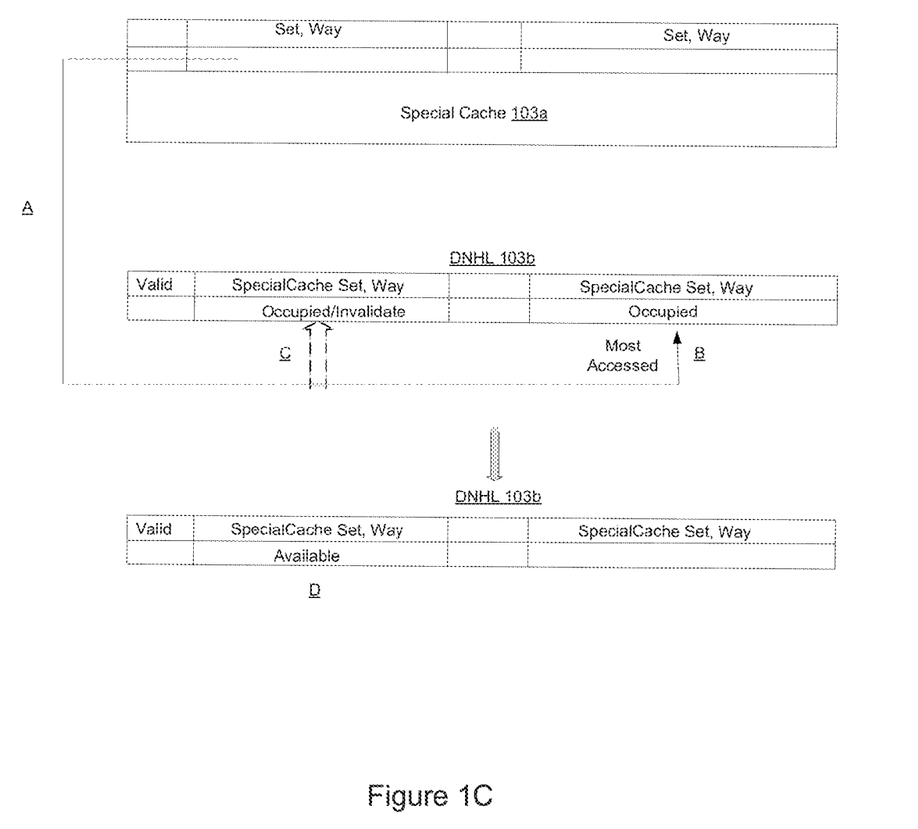
FIG. 1C illustrates operations performed by a system for invalidating directory of non-home locations ways according to one embodiment.

FIGS. 1B and 1C illustrate operations performed by system 101 for invalidating directory of non-home locations ways according to one embodiment. These operations, which relate to invalidating directory of non-home locations ways are illustrated for purposes of clarity and brevity. However, it should be appreciated that other operations not illustrated by FIGS. 1B and 1C can be performed in accordance with one embodiment.

Operation of System for Invalidating DNHL Ways that Store an Identifier of a Home Location of an Address Referring to FIG. 1C, at A, a request to store data (e.g., a cache line) in a way of special cache 103a that is being tracked by DNHL 103b is accessed.

At B, it is determined if an address that is a part of a cache line that is stored in that way of special cache 103a is stored in a non-home location or in its home location.

At C, if the address is not stored in a non-home location, the set in DNHL 103b that tracks the location (the set and way) of special cache 103a where the address is stored is identified.

At D, the set and way of the location of special cache 103a where the address is stored is compared with set and way identifiers stored in each way of the set of DNHL 103b.

At E, if a matching set and way identifier is found in a way of the set of DNHL 103b, invalidating the way of the set of DNHL 103b that stores a matching set and way identifier. The location that is invalidated becomes available for tracking an address that is stored in a non-home location as shown at F.

Operation of System for Invalidating a DNHL Way Other than that which Stores an Identifier of Most Accessed Cache Location Referring to FIG. 1C, at A, a set of DNHL 103b that tracks a non-home location of an address is identified.

At B, if none of one or more locations of the set of DNHL 103b are available for storing an identifier of a non-home location, the location of the one or more locations that has been most accessed is determined.

At C, a location of the set of DNHL 103b other than the location of the one or more locations of the set of DNHL 103b that has been most accessed is invalidated. The location that is invalidated becomes available for tracking an address that is stored in a non-home location as shown at D.

Figure 2:
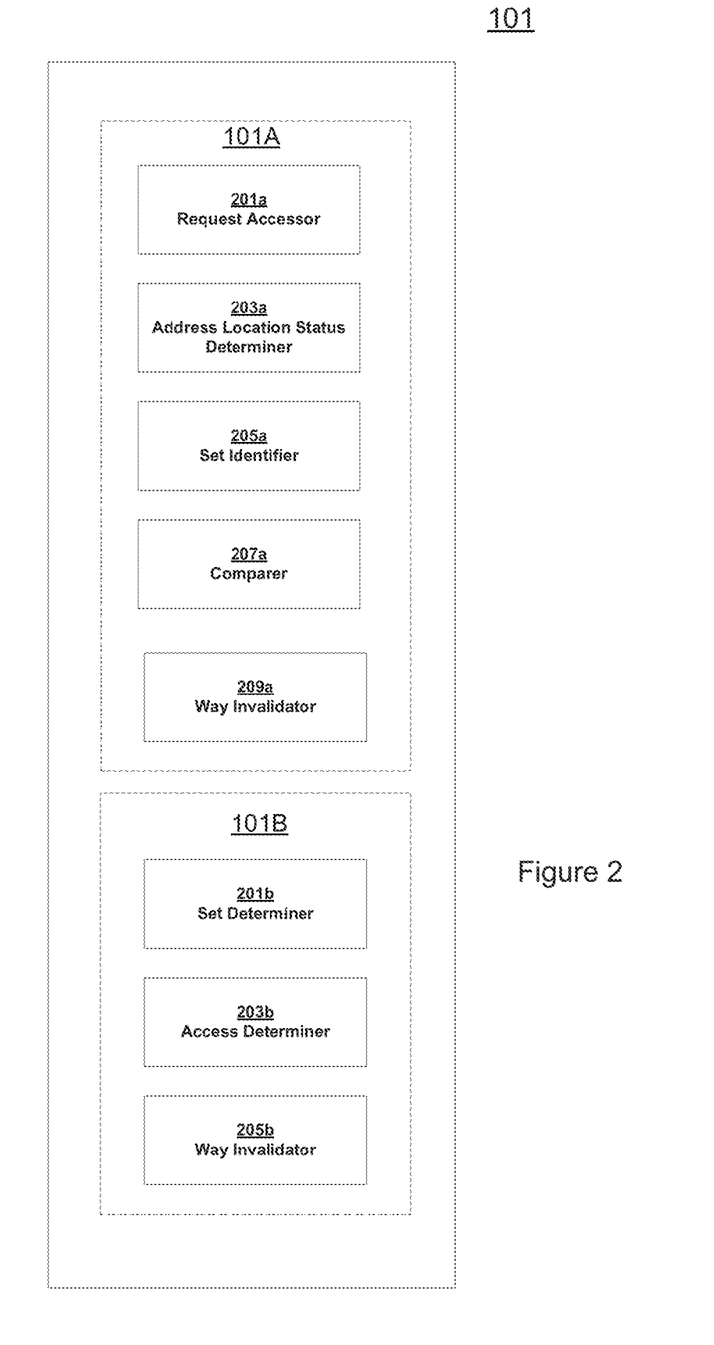
FIG. 2 shows components of a system for invalidating directory of non-home locations ways according to one embodiment.

Components of System for Invalidating Directory of Non-Home Locations Way According to One Embodiment FIG. 2 shows components of a system 101 for invalidating directory of non-home locations ways according to one embodiment. In one embodiment, components of system 101 implement an algorithm for invalidating non-home location directory ways. In one embodiment, system 101 includes subsystem 101A and subsystem 101B. In the FIG. 2 embodiment, components of subsystem 101A include request accessory 201a, address location status determiner 203a, set identifier 205a, comparer 207a and way invalidator 209a. In the FIG. 2 embodiment, components of subsystem 101B include set determiner 201b, access determiner 203b and way invalidator 205b.

Components of Subsystem for Invalidating a Directory of Non-Home Locations Way Storing an Identifier of a Home Location of an Address Request accessory 201a accesses requests to store data (e.g., cache lines including their addresses) in a location (e.g., a way of a set) of a special cache (e.g., 103a in FIG. 1A) that is being tracked by a directory of non-home locations (e.g., 103b in FIG. 1A). In one embodiment, request accessory 201a monitors incoming requests to store data in the special cache that seek to place data in a location that is tracked by the directory of non-home locations.

Address location status determiner 203a determines if an address of a cache line already present in the location of the special cache where data is sought to be stored is stored in a non-home location. In one embodiment, each cache line that is stored in the special cache includes a bit that indicates whether or not the location of the special cache where the cache line is stored is a non-home location of an address that is contained in the cache line. In one embodiment, address location status determiner 203a examines the bit of the cache line that indicates that an address of the cache line is or is not stored in its non-home location to make its determinations regarding the location status of an address.

Set identifier 205a identifies a set in the directory of non-home locations that tracks the location (the set and way) of the special cache where the incoming request seeks to place data, if an address contained in the cache line stored in the location is not stored in a non-home location. In one embodiment, each set of the special cache is tracked by a designated set of the directory of non-home locations. Set identifier 205a identifies the designated set of the directory of non-home locations such that the specific way that tracks the location of the special cache where the cache line that includes an address that is not stored in a non-home location can be identified.

Comparer 207a compares the set and way of the location of the special cache that stores a cache line that includes an address that is not stored in a non-home location with set and way identifiers stored in each way of the aforementioned designated set of the directory of non-home locations that corresponds to the location of the special cache. In one embodiment, the identifiers of the set and way of the special cache that are stored in the ways of the directory of non-home locations enable the aforementioned comparison that facilitates the determination of whether or not a way is tracking a location of the special cache that stores an address that is not in a non-home location.

Way Invalidator 209a invalidates the way of the set of the directory of non-home locations that tracks a location of the special cache that that stores an address that is not in a non-home location. In one embodiment, way invalidator 209a invalidates the way based on the outcome of the comparison that is performed by comparer 207a (if the aforementioned comparison indicates that a matching set and way identifier of the special cache location is found in a way of the corresponding set of the directory of non-home locations). In one embodiment, the invalidation of the way of the directory of non-home locations enables an incoming request to store an address in a non-home location of the corresponding set of the special cache.

Components of Subsystem for Invalidating a DNHL Way Other than that which Stores an Identifier of a Most Accessed Cache Location Referring again to FIG. 2, set determiner 201b determines a set of a directory of non-home locations that tracks a non-home location of an address of a cache line that is stored in the special cache. In one embodiment, the set of the directory of non-home locations that tracks the non-home location of an address in the special cache is predetermined.

Access determiner 203b determines which of the locations tracked by a set of the directory of non-home locations has been most accessed. In one embodiment, access determiner 203b determines the location that has been most accessed if none of the locations of the set of the directory of non-home locations are available for tracking the non-home location of the an incoming address in a special cache set that corresponds to the set of the directory of non-home locations. In one embodiment, a counter is used to track the accesses of each of the ways of the directory of non-home locations. As such, access determiner 203b can directly determine the way that has been most accessed by examining the state of the counters for each of the ways of the directory of non-home locations.

Way invalidator 205b invalidates a way of the set of the directory of non-home locations other than the way of the set of the directory that has been most accessed. In one embodiment, way invalidator 209b invalidates the way based on the outcome of the determination that is performed by access determiner 207b (based on counters that enable the determination of the most accessed way of the directory of non-home locations). In one embodiment, the invalidation of the way of the directory of non-home locations frees space in the directory of non-home locations and enables an incoming request to store an address in a non-home location of a corresponding set of the special cache.

It should be appreciated that the aforementioned components of system 101 can be implemented in hardware or software or in a combination of both. In one embodiment, components and operations of system 101 can be encompassed by components and operations of one or more computer components (e.g., cache controller 103c). In another embodiment, components and operations of system 101 can be separate from the aforementioned one or more computer components but can operate cooperatively with components and operations thereof.

Figure 3A:
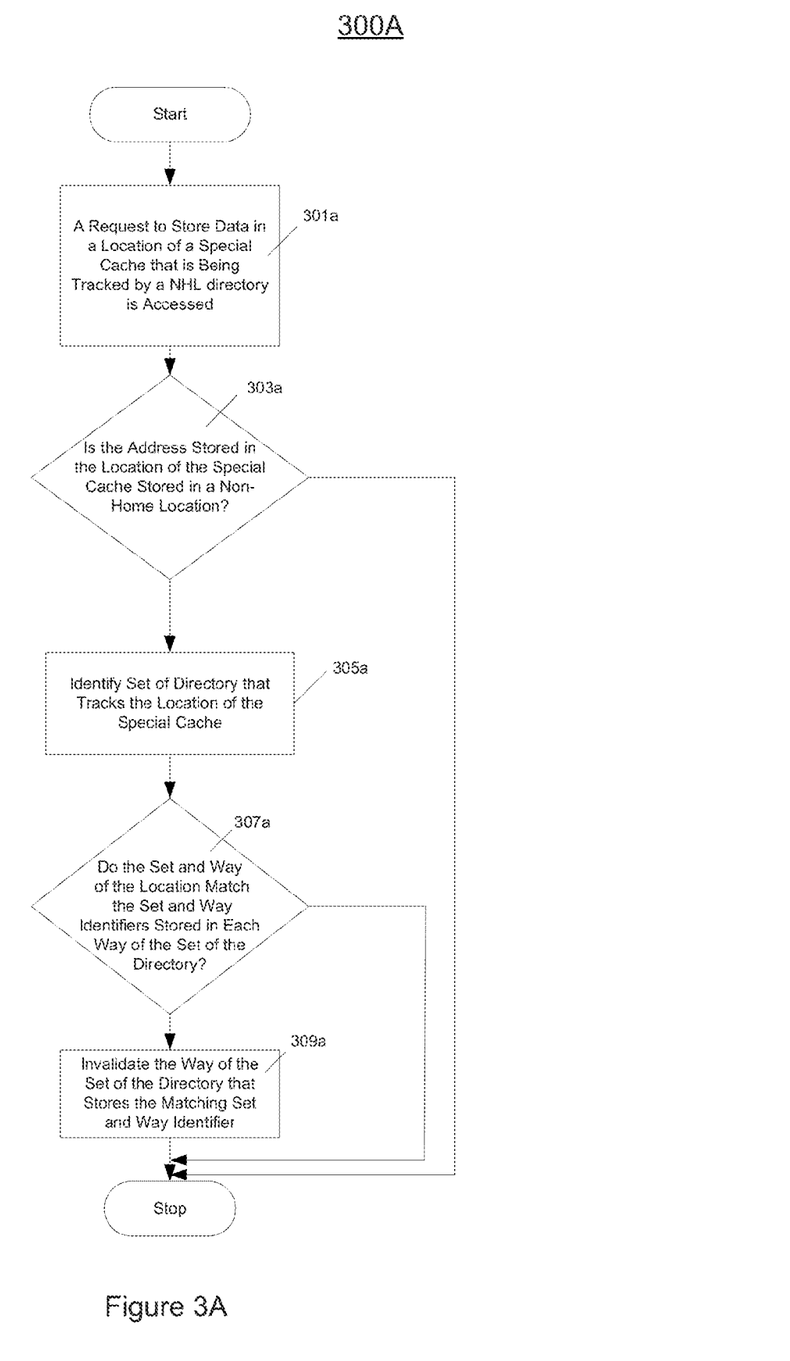
FIG. 3A is a flowchart of a method for invalidating directory of non-home locations ways according to one embodiment.
Figure 3B:
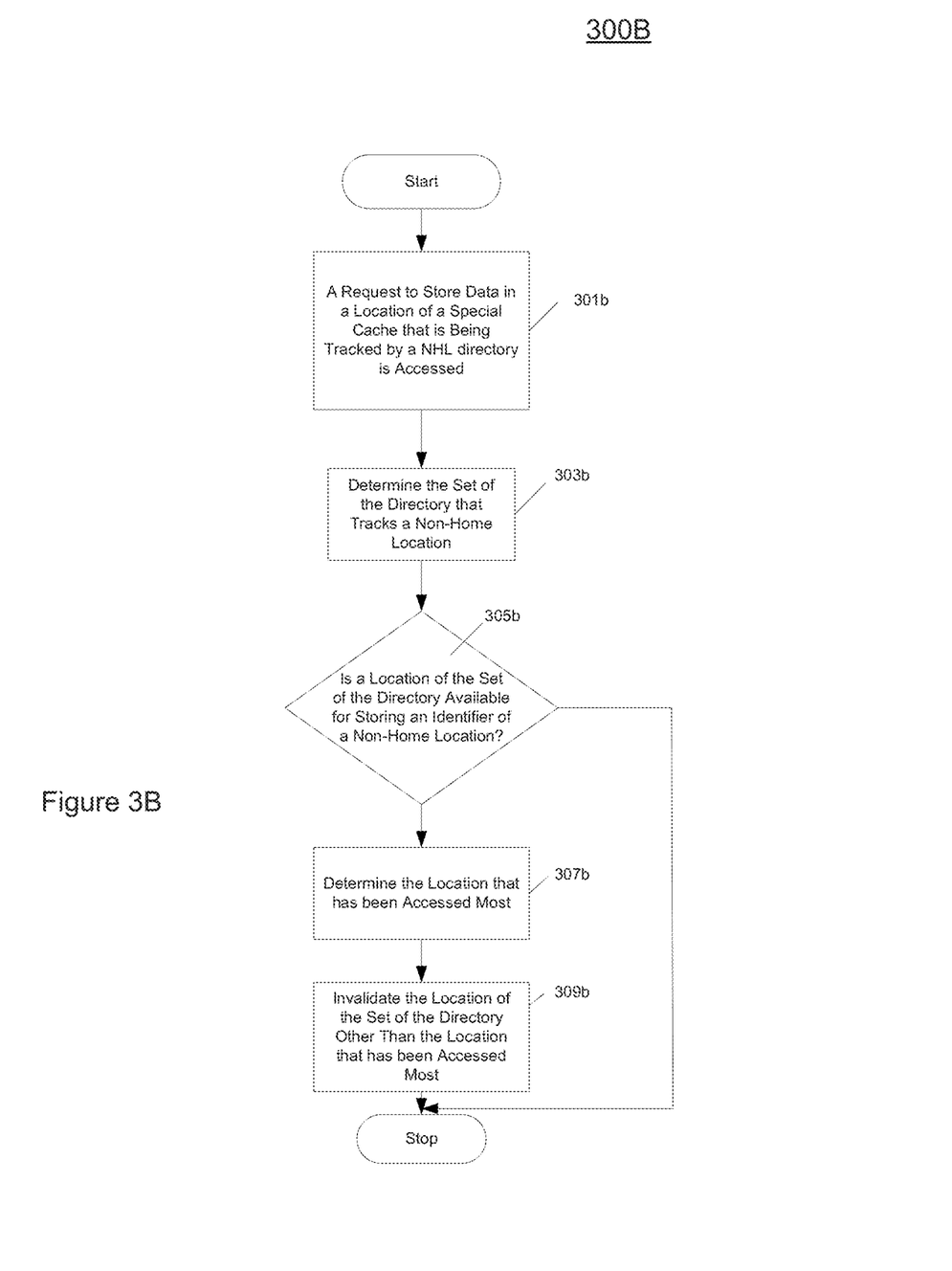
FIG. 3B is a flowchart of a method for invalidating directory of non-home locations ways according to one embodiment.

Method for Invalidating Directory of Non-Home Locations Ways According to One Embodiment FIGS. 3A and 3B show flowcharts 300A and 300B of a method for invalidating directory of non-home locations ways according to one embodiment. FIG. 3A shows a flowchart of a method 300A for invalidating directory of non-home locations ways that store an identifier of a home location of an address. FIG. 3B shows a flowchart of a method 300B for invalidating a directory of non-home locations way other than that which stores an identifier of a most accessed way of DNHL 103b. The flowcharts include processes that, in one embodiment can be carried out by processors and electrical components under the control of computer-readable and computer-executable instructions. Although specific operations are shown in the flowcharts, such operations are exemplary. That is the present embodiment is well suited to performing various other operations or variations of the operations recited in the flowcharts.

Referring to FIG. 3A, at 301a, a request to store data (e.g., cache lines including their addresses) in a location of a special cache that is being tracked by a directory of non-home locations is accessed.

At 303a, it is determined if an address stored in the location of the special cache is stored in a non-home location.

At 305*a*, a set in the directory of non-home locations that tracks the location (the set and way) of the special cache is identified if the address is not stored in a non-home location.

At 307*a*, the set and way of the location is compared with set and way identifiers stored in each way of the set of the directory of non-home locations.

At 309*a*, if a matching set and way identifier is found in a way of the set of the directory of non-home locations, the way of the set of the directory of non-home locations is invalidated that stores the matching set and way identifier.

Referring to FIG. 3B, at 301*b*, a request to store data (e.g., cache lines including their addresses) in a non-home location of a special cache that is being tracked by a directory of non-home locations is accessed.

At 303*b*, a set of the directory of non-home locations that tracks the set of the non-home location of the special cache is determined.

At 305*b*, it is determined if a location (e.g., way) of the set of the directory of non-home locations is available for storing an identifier of a non-home location.

At 307*b*, it is determined which of one or more locations of the directory of non-home locations has been most accessed if none of one or more locations of the set of the directory of non-home locations are available for storing an identifier of the non-home location.

At 309*b*, a location (e.g., way) of the set of the directory of non-home locations other than the location (e.g., way) of the set of the directory of non-home locations that has been most accessed is invalidated.

With regard to exemplary embodiments thereof, systems and methods for invalidating a way of a directory for non-home locations (DNHL) that stores an identifier of a home location of an address is disclosed. As a part of a method, a request to store data in a location of a special cache that is being tracked by the way of the DNHL is accessed, it is determined if an address stored in the location of the special cache is stored in a non-home location, a set is identified in the DNHL that tracks the location of the special cache if the address is not stored in a non-home location, and a set and way of the location of the special cache is compared with a set and way identifier stored in each way of the set of the DNHL. The way of the set of the DNHL that stores a matching set and way identifier is invalidated.

In addition, systems and methods of invalidating a way of a DNHL set other than that which stores an identifier of a most accessed special cache way are disclosed. As a part of a method, a DNHL set that tracks a non-home location for an address that is to be stored in the non-home location and that is associated with an incoming request is determined, if none of one or more ways of the DNHL set are available for storing an identifier of the non-home location, and the way of the one or more ways that has been most accessed is determined. A way of the DNHL set other than the way of the DNHL set that has been most accessed is invalidated.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

I claim:

1. A method for invalidating a way of a directory of non-home locations (DNHL) that stores an identifier of a home location of an address, comprising:
    accessing a request to store data of a cache line at a location of a special cache that is being tracked by said way of said DNHL;
    determining if a cache line with an associated address that is stored in said location of said special cache is stored in a non-home location, wherein the cache line with the address in said location is stored in a non-home location if the location of the cache line in the special cache is a function of another address other than the address of the cache line;
    if said cache line with the address is not stored in a non-home location, identifying a set in said DNHL that tracks said location of said special cache;
    comparing a set and way of said location of said special cache with a set and way identifier stored in each way of said set of said DNHL; and
    if a matching set and way identifier is found in a way of said set of said DNHL, invalidating a way of said set of said DNHL that stores said matching set and way identifier.

2. The method of claim 1 wherein said determining if the cache line, with the associated address, that is stored in said location of said special cache is stored in a non-home location comprises examining a bit in the cache line that comprises said address.

3. The method of claim 1 wherein said identifying determines a set of said DNHL that is designated to track a set of said special cache that contains said location of said special cache.

4. The method of claim 1 wherein said invalidating frees said way of said set of said DNHL to store data.

5. The method of claim 1 wherein said set and way identifiers identify a set and a way of said special cache.

6. The method of claim 1 wherein said special cache stores addresses in home and non-home locations.

7. The method of claim 1 wherein each set of said DNHL comprises a plurality of ways.

8. A processor for invalidating a way of a directory for non-home locations (DNHL) that stores an identifier of a home location of an address, wherein the processor is to:
    access a request to store data in a cache line at a location of a special cache that is being tracked by said way of said DNHL;
    determine if a cache line with an associated address that is stored in said location of said special cache is stored in a non-home location, wherein the cache line with the address in said location is stored in a non-home location if the location of the cache line in the special cache is a function of another address other than the address of the cache line;
    if said cache line with the address is not stored in a non-home location, identify a set in said DNHL that tracks said location of said special cache;
    compare a set and way of said location of said special cache with a set and way identifier stored in each way of said set of said DNHL; and if a matching set and way identifier is found in a way of said set of said DNHL, invalidate said way of said set of said DNHL that stores said matching set and way identifier.

9. The processor of claim 8 wherein said determining if the cache line, with the associated address, that is stored in said location of said special cache is stored in a non-home location comprises examining a bit in the cache line that comprises said address.

10. The processor of claim 8 wherein said identifying determines a set of said DNHL that is designated to track a set of said special cache that contains said location of said special cache.

11. The processor of claim 8 wherein said invalidating frees said way of said set of said DNHL to store data.

12. The processor of claim 8 wherein said set and way identifiers identify a set and a way of said special cache.

13. The processor of claim 8 wherein said special cache stores addresses in home and non-home locations.

14. The processor of claim 8 wherein each set of said DNHL comprises a plurality of ways.

15. A cache controller for invalidating a way of a directory for non-home locations (DNHL) that stores an identifier of a home location of an address, the cache controller to:
    access a request to store data in a cache line at a location of a special cache that is being tracked by said way of said DNHL;
    determine if a cache line with an associated address that is stored in said location of said special cache is stored in a non-home location, wherein the cache line with the address in said location is stored in a non-home location if the location of the cache line in the special cache is a function of another address other than the address of the cache line;
    if said cache line with the address is not stored in a non-home location, identify a set in said DNHL that tracks said location of said special cache;
    compare a set and way of said location of said special cache with a set and way identifier stored in each way of said set of said DNHL; and
    if a matching set and way identifier is found in a way of said set of said DNHL, invalidate said way of said set of said DNHL that stores said matching set and way identifier.

16. The cache controller of claim 15 wherein said determining if the cache line, with the associated address, that is stored in said location of said special cache is stored in a non-home location comprises examining a bit in the cache line that comprises said address.

17. The cache controller of claim 15 wherein said identifying determines a set of said DNHL that is designated to track a set of said special cache that contains said location of said special cache.

18. The cache controller of claim 15 wherein said invalidating frees said way of said set of said DNHL to store data.

19. The cache controller of claim 15 wherein said set and way identifiers identify a set and a way of said special cache.

20. The cache controller of claim 15 wherein said special cache stores addresses in home and non-home locations.

21. A method of invalidating a way of a directory for non-home locations (DNHL) other than that which stores an identifier of a most accessed special cache location, said method comprising:
    determining a set of a DNHL that tracks a non-home location of a cache line with an associated address that is stored in a special cache, wherein the cache line with the address is stored in the non-home location of the special cache as a function of another address other than the address;
    if none of one or more locations of said set of said DNHL are available for storing an identifier of said non-home location, determining which of said one or more locations has been most accessed; and invalidating a location of said set of said DNHL other than said one or more locations of said set of said DNHL that has been most accessed.

22. The method of claim 21 wherein said determining comprises identifying a set of said DNHL that is designated to track a set of said special cache that contains said location of said special cache.

23. The method of claim 21 wherein each location of said set of said DNHL is associated with a counter.

24. The method of claim 21 wherein said determining which of said one or more locations has been most accessed includes examining a counter associated with said one or more locations.

25. The method of claim 21 wherein said invalidating frees a way of said set of said DNHL to store data.

26. The method of claim 21 wherein said special cache stores addresses in home and non-home locations.

27. The method of claim 21 wherein each set of said DNHL comprises a plurality of ways.

28. A processor system for invalidating a way of a directory for non-home locations (DNHL) other than that which stores an identifier of a most accessed special cache location, said processor system to:
    determine a set of a DNHL that tracks a non-home location of a cache line with an associated address that is stored in said special cache, wherein the cache line with the address is stored in the non-home location of the special cache as a function of another address other than the address;
    if none of one or more locations of said set of said DNHL are available for storing an identifier of said non-home location, determine which of said one or more locations has been most accessed; and
    invalidate a location of said set of said DNHL other than a location of said set of said DNHL that has been most accessed.

29. The processor system of claim 28 wherein said determining identifies a set of said DNHL that is designated to track a set of said special cache that contains said location of said special cache.

30. The processor system of claim 28 wherein each of said one or more locations of said set of said DNHL is associated with a counter.

31. The processor system of claim 28 wherein said determining which of said one or more locations has been most accessed includes examining a counter associated with said one or more locations.

32. The processor system of claim 28 wherein said invalidating frees said location of said set of said DNHL to store data.

33. The processor system of claim 28 wherein said special cache stores addresses in home and non-home locations.

34. The processor system of claim 28 wherein each set of said DNHL comprises a plurality of ways.

35. A processor for invalidating a way of a directory for non-home locations (DNHL) other than that which stores an identifier of a most accessed special cache location, the processor to:
    determine a set of a DNHL that tracks a non-home location of a cache line with an associated address that is stored in said special cache, wherein the cache line with the address is stored in the non-home location of the special cache as a function of another address other than the address;

if none of one or more locations of said set of said DNHL are available for storing an identifier of said non-home location, determine which of said one or more locations has been most accessed; and invalidate a location of said set of said DNHL other than a location of said set of said DNHL that has been most accessed.

36. The processor of claim 35 wherein said determining identifies a set of said DNHL that is designated to track a set of said special cache that contains said location of said special cache.

37. The processor of claim 35 wherein said determining which of said one or more locations has been most accessed includes examining a counter associated with said one or more locations.

38. The processor of claim 35 wherein said invalidating frees said way of said set of said directory to store data.

39. The processor of claim 35 wherein said special cache stores addresses in home and non-home locations.

40. The processor of claim 35 wherein each set of said DNHL comprises a plurality of ways.

* * * * *